United States Patent Office 3,822,299
Patented July 2, 1974

3,822,299
REACTION PRODUCT OF AN ALKYLENE OXIDE CONDENSATE AND SULFUR
Thomas Craig Lukeman, Ascot Vale, Victoria, and Robert Edward Bohun, Doncaster, Victoria, Australia, assignors to Imperial Chemical Industries of Australia and New Zealand Limited, Melbourne, Victoria, Australia
No Drawing. Filed Sept. 17, 1970, Ser. No. 73,182
Claims priority, application Australia, Oct. 3, 1969, 61,849/69
Int. Cl. C08h 3/00, 9/02
U.S. Cl. 260—399
4 Claims

ABSTRACT OF THE DISCLOSURE

The reaction product of sulphur and the alkylene oxide condensate of at least one compound R—L—H wherein R is an olefinic chain having at least 9 carbon atoms in the chain, L is a linking group and H is an alkylene-oxide reactive hydrogen atom.

---

This invention relates to new products useful in metal working and in particular to new water soluble or water dispersible products suitable for use as extreme pressure lubricants, antiwelding agents and as cutting oils.

In metal working processes where severe metal to metal contact may be encountered such as in the slideway of machine tools, in various metal cutting operations or in the manufacture of metal gears it has been the practice to use additives which react chemically with the metal surface to form low shear strength surface layers. Such additives are for example the reaction products of sulphur with unsaturated oils such as sperm oil and neatsfoot oil. These additives suffer from the disadvantage that they are pasty solids which are difficult to remove from the surface of the workpiece without the use of degreasing solvents. Furthermore they are difficult to formulate into compositions suitable for application to the surface of the workpiece; attempts to overcome this difficulty by the addition of mineral oils and emulsifiers, while affording some improvement, introduce the further difficulty that the compositions then tend to foam, thus often obscuring the workpiece surface.

We have now found new products which do not suffer from the disadvantages of the prior art and which are suitable in metal working processes. In a first aspect they are useful as extreme pressure lubricants, in that under conditions of severe metal to metal contact they prevent, inhibit or at least substantially retard destructive welding. In another aspect they are useful as cutting oils.

Accordingly we provide the reaction product of sulphur and the alkylene oxide condensate of at least one long chain compound R—L—H wherein R is an olefinic chain having at least 9, preferably 17 carbon atoms in the chain, L is a linking group and H is an alkylene-oxide-reactive hydrogen atom. The linking group L may be for example —COO—, —CONH—, —NH—, —O— or —S— but its nature is not narrowly critical. R may be chosen from long mono- or di-olefinic chains containing from 9 to 26, preferably 17 to 21 carbon atoms. The olefinic chain may optionally contain even more than two olefinic groups and may also be substituted, for example by aryl or hydroxy groups or halogen atoms.

Typical examples of the compound R—L—H are citronellic acid, undecylenic acid, oleic acid, ricinoleic acid, linoleic acid, brassidic acid, erucic acid, tall oil acid, sperm oil acid, neatsfoot oil acid, castor oil acid, cotton seed acid, peanut oil acid, rape seed acid, citronellol, linalool, phytol, decenylamine, dodecenylmethylamine, didodecenylamine, tetradecenylamine, docosenylamine, and octadecenylamine. If desired mixtures of these R—L—H compounds may also be used to form our reaction product. Furthermore the R—L—H compound may be used in conjunction with a saturated compound. Thus for example, a mixture of cetylamine and oleylamine, which in this form is available commercially, is convenient. Accordingly we provided the reaction product of sulphur and an alkylene oxide condensate wherein said alkylene oxide condensate comprises a long chain olefinic compound R—L—H and a long chain saturated compound R'—L'—H wherein R is an olefinic chain having at least 9, preferably 17, carbon atoms in the chain, R' is a saturated chain having at least 9, preferably 16, carbon atoms in the chain, L and L' which may be the same or different are linking groups and H is an alkylene-oxide-reactive hydrogen atom. The linking groups L and L' may be for example, —COO—, —CONH—, —NH—, —O— or —S— but their nature is not narrowly critical.

The alkylene oxide from which the condensate may be formed is preferably a lower alkylene oxide or a mixture of lower alkylene oxides. Thus the alkylene oxide may be for example, ethylene oxide, propylene oxide or a mixture of ethylene oxide and propylene oxide. Sufficient alkylene oxide should be present in the condensate to make the reaction product water soluble or readily dispersible in water. Thus we have found that particularly suitable condensates are those which contain from 1 to 20, preferably 5 to 10, moles of alkylene oxide per mole of the long chain compound present. Our preferred reaction products are water soluble at the concentrations used. Where mixtures of alkylene oxides are used the ratio of ethylene oxide to higher alkylene oxides depends of course on the hydrophilic-hydrophobic balance, i.e. among other factors on the chain length of R and/or R'; as a rule more than half of the alkylene oxide is ethylene oxide. The greater the ratio ethylene oxide/alkylene oxide is, the higher is the water solubility; the minimum amount of ethylene oxide required for a given molecule R—L—H and/or R'—L'—H and a desired degree of water solubility is readily determined by simple experimentation.

The reaction product may contain amounts of sulphur varying from 0.3 to 2, preferably from 0.8 to 1.2, moles of sulphur per mole of alkylene oxide condensate.

Whilst we do not wish to be bound by theoretical considerations it is thought that the product is crosslinked by the sulphur atom across the double bond or bonds of the olefinic chain by a bridge —$H_2C$—S—$CH_2$—. Variations in the degree of cross-linking will produce variations in the reaction product; the reaction product is not necessarily a pure compound.

We also provide a process for the manufacture of the reaction product of sulphur and the alkylene oxide condensate of a compound R—L—H as hereinbefore defined which process comprises reacting an alkylene oxide condensate of said compound R—L—H with sulphur. We also provide a process for the manufacture of the reaction product of sulphur and an alkylene oxide condensate wherein said alkylene oxide condensate comprises a long chain olefinic compound R—L—H as hereinbefore defined and a long chain saturated compound R'—L'—H as hereinbefore defined which process comprises reacting an alkylene oxide condensate of a mixture of said compounds R—L—H and R'—L'—H with sulphur.

The reaction between the alkylene oxide condensate and sulphur is performed preferably at atmospheric pressure; elevated pressures may be used without any particular advantage. Reaction temperatures are not narrowly critical and are usually in the range from 95° C. to 160° C. preferably from 110° C. to 130° C. The sulphur may be added as a solid or in a molten condition to the condensate. The time of reaction depends on the nature of the alkylene oxide condensate, temperature and thet degree of stirring of the reaction mixture; it will vary from a few minutes to several hours. After the reaction is complete the reaction product is preferably subjected to treatment with a stream of gas, for example, air or nitrogen, to remove undesired volatile byproducts resulting from impurities in the condensate, for example, hydrogen sulphide, from the reaction product.

Our reaction products are useful as lubricants in metal working processes. Accordingly we provide an aqueous metal working lubricating composition of matter comprising a reaction product according to this invention, water and optionally solubilizing agents. Preferably our composition is a solution particularly a colloidal solution of our reaction products; alternatively it may be a concentrate/dispersion of our reaction product in water. In addition the composition may comprise conventional cutting or lubricating additives.

We also provide a process of lubricating a metal surface which process comprises lubricating said metal surface, optionally in the presence of water, with a reaction product according to this invention.

Our reaction product is particularly useful as a lubricant in metal working processes where severe metal to metal contact may be encountered and where the metal surface or surfaces may be subjected to elevated pressures and/or temperatures. Accordingly we provide a process of lubricating a metal surface which is at elevated pressures and/or temperatures.

Our reaction products are also useful as cutting oils in the working and shaping of metals. Accordingly we also provide a process of shaping a metal surface which process comprises shaping a metal surface in the presence of a reaction product according to this invention.

Our reaction products are liquids which are soluble or easily dispersible in water; consequently, unlike many extreme pressure lubricants of the prior art, they are easily removed from the surface of the workpiece by flushing with water and there is no need to use degreasing solvents. Since they are free flowing liquids at normal room temperatures they may be applied at any desired rate to the surface of a metal workpiece by conventional means, for example by drip feeding or by means of a circulatory system. They also have the advantage that they do not foam in use and thus do not obscure the surface of the workpiece whilst it is being processed.

Our products may be used to advantage in operations relating to metal cutting, machining, grinding, honing and lapping, the manufacture of metal gears, the processing and shaping of alloys of metals for example, titanium alloys, metal drawing and rolling operations and the lubrication of sliding or engaging metal surfaces.

Our invention is now illustrated by the following examples but these examples should not be construed as limiting.

Example 1

523 g. (1 mole) of an ethoxylated tall oil acid which had been prepared by condensing one mole of tall oil acid with 5 moles of ethylene oxide was charged into a reactor at room temperature and sulphur 32 g. (1 mole) was added with constant stirring. The stirred contents of the reactor were then heated to about 120° C. and maintained at this temperature for three hours. Heating was then discontinued and air was blown through the reaction product until the issuing gas was substantially free of hydrogen sulphide. There was thus obtained a product which comprised a tall oil acid ethoxylated with 5 moles of ethylene oxide per mole of tall oil acid and approximately 1 mole of sulphur per mole of ethylene oxide condensate.

Example 2

Example 1 was repeated but the amount of sulphur added was 64 g. (2 moles). There was thus obtained a product which comprised a tall oil acid ethoxylated with 5 moles of ethylene oxide per mole of tall oil acid and approximately 2 moles of sulphur per mole of ethylene oxide condensate.

Examples 3–12

Example 1 was repeated but the ethoxylated tall oil acid was replaced by 1 mole of the ethoxylated condensates set out in Table I.

TABLE I

| Example number | Ethoxylated condensate Long chain compound | Moles of ethylene oxide per mole of long chain compound |
|---|---|---|
| 3 | Ricinoleic acid | 2.5 |
| 4 | Cotton seed acid | 5 |
| 5 | Oleic acid | 6 |
| 6 | Amide of oleic acid | 5 |
| 7 | Mixture of cetylamine and oleylamine | 5 |
| 8 | do | 15 |
| 9 | Mixture of cetyl alcohol and oleylalcohol | 6 |
| 10 | Citronellic acid | 5 |
| 11 | Rape seed acid | 5 |
| 12 | Castor oil acid | 12 |

Example 13

Using the procedure of Example 1, 1 mole of an ethoxylated tall oil acid which had been prepared by condensing 1 mole of tall oil acid with 20 moles of ethylene oxide was reacted with 0.4 mole of sulphur.

Example 14

Example 1 was repeated but prior to the addition of the sulphur the ethylene oxide condensate was heated to 120° C. The sulphur was added in solid form to the heated condensate. A product similar to that of Example 1 was obtained.

Example 15

Example 14 was repeated, but the sulphur was added in liquid form to the heated condensate. A product similar to that of Example 1 was obtained.

Example 16

This example demonstrates the efficacy of reaction products of our invention as cutting oils. The method used was the standard method for measuring wear properties of fluid lubricants (Falex method) ASTM designation D2670-67. The results are set out in Table II.

TABLE II

| Material under test | Total teeth wear |
|---|---|
| 1. Reaction product of an ethoxylated tall oil acid containing 5 moles of ethylene oxide per mole of tall oil acid and sulphur. Total sulphur content of product 5% w./w. | 371 |
| Prior art products: | |
| 2. Commercially available sulphurized neatsfoot oil | 48 |
| 3. Commercially available sulphurized sperm oil | 57 |
| 4. Commercially available sulphurized hydrocarbon oil | 9 |

From Table II it will be seen that the product of our invention is rated as being about seven times as efficient as a cutting oil compared to prior art products when tested by the above method.

Example 17

This example demonstrates the efficacy of reaction products of our invention as extreme pressure lubricants useful for inhibiting pressure welding of metallic surfaces. The apparatus and method used was that developed by the Timken Roller Bearing Co., U.S.A., for predicting the performance of lubricants in preventing wear under heavy duty conditions. Table III sets out the pressure at which seizure occurred when certain products of our invention and aqueous solutions thereof were tested by this method. The results using prior art compounds are also included in Table III for the purposes of comparison.

TABLE III

| Lubricant | Load (lb./sq. in.) at which seizure occurred |
|---|---|
| Product of Example 1 | 17,400 |
| 1 part of product of Example 1 diluted with 15 parts of water | 11,200 |
| Commercially available extreme pressure lubricant sold under the registered trademark "Aquamatic" and believed to comprise 10% mineral oil, 17% of an amine and balance water | 10,100 |
| 1 part of "Aquamatic" diluted with 15 parts of water | 5,700 |

Example 18

303 g. (1 mole) of tall oil acid was ethoxylated and then propoxylated to give a condensate containing 5 moles of ethylene oxide and 1 mole of propylene oxide per mole of tall oil acid. The condensate was then heated with stirring to 120° C. and 32 g. (1 mole) of sulphur was added. The mixture was then stirred for three hours at a temperature ranging from 120 to 130° C. Heating was then discontinued and the small amount of hydrogen sulphide which had formed as a result of reaction of impurities in the tall oil with the sulphur was substantially removed by passing a stream of air through the reaction product. There was thus obtained a product which comprised a tall oil acid condensed with 5 moles of ethylene oxide and 1 mole of propylene oxide per mole of tall oil acid and approximately 1 mole of sulphur per mole of tall oil condensate.

Example 19

The general procedure of Example 18 was repeated but the condensate was only heated to a temperature from 85 to 90° C. prior to the addition of sulphur. Even with prolonged stirring in this temperature range the amount of sulphur which reacted with the condensate was only slight. However when the temperature of the mixture was raised to 95° C., reaction between the condensate and the sulphur occurred more rapidly. Stirring was continued at this temperature for four hours, and after removal of gaseous impurities a product similar to that of Example 18 was obtained.

Example 20

Example 1 was repeated, but the condensate of that example was replaced by a propoxylated tall oil acid which had been prepared by condensing one mole of tall oil acid with 7 moles of propylene oxide. There was thus obtained a product which comprised a tall oil acid propoxylated with 7 moles of propylene oxide per mole of tall oil acid and approximately 1 mole of sulphur per mole of propylene oxide condensate.

Example 21

Example 20 was repeated, but the temperature of reaction was raised to 160° C. A product similar to that of Example 20 was obtained.

Example 22

This example demonstrates the efficacy of reaction products of our invention as a lubricant and cutting fluid in a drilling operation. Using an automatic commercially available radial drill, fitted with a cutting fluid reservoir of 12 gallons capacity, holes were drilled in a steel sheet. The drill operated at a speed of 360 revolutions per minute and a feed rate of 72 cuts per inch to drill holes 2 inches in depth and 41/64" in diameter. A cutting fluid composition was prepared by dissolving 1 part by weight of the reaction product of an ethoxylated tall oil acid containing 5 moles of ethylene oxide per mole of oil and sulphur, and wherein the total sulphur content of the product was 5% w./w., in 30 parts by weight of water. This cutting fluid composition was placed in the cutting fluid reservoir and circulated over the surface of the work piece during the drilling operation. The cutting fluid showed no tendency to foam and the surface of the workpiece was visible throughout the drilling operation. This cutting fluid was used during the drilling of the first 50 holes. At this point in the test a portion of the cutting fluid was removed from the reservoir and replaced with water so that the cutting fluid used for the next 27 holes consisted of 1 part of the reaction product described above and 42 parts of water. The cutting fluid was then diluted further in a similar manner so that the cutting fluid used thereafter to the end of the test consisted of 1 part of the reaction product described above and 55 parts of water. The metal shavings were about 18 inches long and clean throughout the operation and the holes were smooth and clean for the first 218 holes. Thereafter some of the holes were slightly dark but still smooth and clean. The test was terminated after drilling 313 holes when the first instance of jamming occurred. The mean time of drilling a hole was 49.8 seconds with a standard deviation of 0.8 second. The cutting fluid at its various concentrations in water showed little tendency to foam during the drilling operation and did not obscure the workpiece. A film of cutting fluid was left on the workpiece at the conclusion of the test to give protection against rusting of the drilled surfaces. No incidence of rusting of the holes was observed over a period of 24 hours after completing the test. This example demonstrates that the product of our invention is effective in providing lubrication, and cooling of both the drill and the hole and also provides corrosion protection after drilling.

Example 23

The general procedure of Example 22 was repeated, but, for purposes of comparison, the cutting fluid of that example was replaced by a commercially available cutting fluid normally used in drilling operations. The metal shavings were about 12" long and clean throughout the test, and the holes were smooth and bright for the first 69 holes. After drilling the 70th hole the drill showed signs of wear and brown-black marks were apparent on the cutting edge. The test was terminated after drilling 90 holes because of signs of wear on the drill and because of roughness of the holes being produced. The mean time of drilling a hole was 49.1 seconds with a standard deviation of 1.3 seconds. When the results of this example are compared with those of Example 22 it is apparent that the product of our invention improves the drill life considerably and enables more than three times the number of holes to be drilled before failure in comparison with the commercially available cutting fluid.

We claim:

1. The water soluble reaction product of sulfur and the condensate obtained by condensing at least one alkylene oxide selected from the group consisting of ethylene oxide, propylene oxide and mixtures thereof with at least one long chain compound having the formula R—L—H wherein R is an olefinic chain having 9 to 26 carbon atoms and wherein L is selected from the group consisting of —COO—, —NH— and —O—, said alkylene oxide being present in said condensate in an amount in the range from 1 to 20 moles per mole of said long chain compound and said reaction product containing from 0.3 to 2 moles of sulfur per mole of said reaction product, the reaction product being characterized in that it is water soluble.

2. A process for the manufacture of the water soluble reaction product of claim 1 which process comprises reacting sulfur with an alkylene oxide condensate at a temperature in the range of 95° C. to 160° C., said condensate comprising at least one long chain compound having the formula R—L—H wherein R is an olefinic chain having 9 to 26 carbon atoms and wherein L is selected from the group consisting of —COO—, —NH— and —O— condensed with at least one alkylene oxide selected from the group consisting of ethylene oxide, propylene oxide and mixtures thereof, said alkylene oxide being present in said condensate in an amount in the range from 1 to 20 moles per mole of said long chain compound, and wherein the molar ratio of sulfur to said alkylene oxide condensate is in the range from 0.3:1 to 2:1.

3. The water soluble reaction product of Claim 1 wherein said condensate is a condensate of tall oil acid with from 5 to 10 moles of ethylene oxide per mole of tall oil acid.

4. The water soluble reaction product of Claim 1 wherein said condensate is a condensate of oleic acid with from 5 to 10 moles of ethylene oxide per mole of oleic acid.

References Cited
UNITED STATES PATENTS

| | | | |
|---|---|---|---|
| 2,371,207 | 3/1945 | Zublin et al. | 260—399 |
| 2,619,508 | 11/1952 | Mikeska et al. | 260—399 |
| 2,666,744 | 1/1954 | Dixon | 252—33.6 |
| 3,316,237 | 4/1967 | Imparato et al. | 260—139 |
| 3,041,284 | 6/1962 | Calhoun et al. | 260—399 |

ELBERT L. ROBERTS, Primary Examiner

U.S. Cl. X.R.

252—47.5, 48.6; 260—125